(12) United States Patent
Platt (10) Patent No.: US 7,044,451 B2
(45) Date of Patent: May 16, 2006

(54) RAIL CLIP

(76) Inventor: Robert E. Platt, 8701 Highland Ave., Mineral Ridge, OH (US) 44440

(*) Notice: Subject to any disclaimer, the term of this patent is extended or adjusted under 35 U.S.C. 154(b) by 0 days.

(21) Appl. No.: 10/713,519

(22) Filed: Nov. 14, 2003

(65) Prior Publication Data

US 2004/0099855 A1 May 27, 2004

Related U.S. Application Data

(63) Continuation of application No. 10/056,719, filed on Jan. 24, 2002, now Pat. No. 6,698,726.

(51) Int. Cl.
*E04H 17/02* (2006.01)

(52) U.S. Cl. .................. 256/67; 256/65.01; 256/66
(58) Field of Classification Search .............. 256/1, 256/26, 65.01, 66, 67; 403/61, 65, 70, 71, 403/73, 75, 79, 87, 113, 354, DIG. 9
See application file for complete search history.

(56) References Cited

U.S. PATENT DOCUMENTS

| 2,922,609 | A | * | 1/1960 | Collier ................. 248/179.1 |
| 4,150,907 | A | | 4/1979 | Thurnauer |
| 4,415,136 | A | * | 11/1983 | Knoll ................... 248/181.2 |
| 4,621,782 | A | * | 11/1986 | Carlson et al. .......... 248/183.3 |
| 4,767,232 | A | * | 8/1988 | Francis .................. 256/67 |
| 4,923,176 | A | * | 5/1990 | Heinz .................. 256/65.06 |
| 5,026,028 | A | * | 6/1991 | Ooi et al. ............... 256/67 |
| 5,437,433 | A | | 8/1995 | Rezek |
| 5,788,224 | A | | 8/1998 | Platt |

* cited by examiner

*Primary Examiner*—Daniel P. Stodola
*Assistant Examiner*—Victor MacArthur
(74) *Attorney, Agent, or Firm*—Sand & Sebolt (57) ABSTRACT

A fence rail clip for attaching a fence rail to a vertical fence post is disclosed. The rail clip has a bracket and a rail connector. The bracket may be secured to the vertical post. The rail connector has a rail receiving receptacle into which an end of a rail may be inserted and the connector is adapted to slidingly engage the bracket. When the position of the rail connector is altered by sliding the rail connector along the bracket, the angle of the rail receiving receptacle is altered, thereby changing the angle at which a rail may be attached to the post.

16 Claims, 11 Drawing Sheets

RAIL CLIP

CROSS REFERENCE TO RELATED APPLICATIONS

This application is a continuation of U.S. patent application Ser. No. 10/056,719, filed Jan. 24, 2002, now U.S. Pat. No. 6,698,726, issued Mar. 2, 2004.

BACKGROUND OF THE INVENTION

1. Technical Field

This invention generally relates to clips. More particularly, the invention relates to fence rail clips which fasten fence rails to vertical fence posts. Specifically, the invention relates to a clip with a bracket that attaches to the post and a rail connector that is adapted to receive an end of a fence rail and to hold that rail at any one of a range of angles relative to the post.

2. Background Information

It has recently become more common to use either vinyl or plastic products for constructing fences for yards or decks and for railings on deck staircases. While vinyl fencing is aesthetically pleasing and easy to maintain, it poses somewhat of a problem for the contractor who must connect the various components together. It is difficult to connect the fence rails to the vertically extending fence posts. It is even more problematic if the rail must be secured to the post at an angle as is required during construction of a staircase or if fence is being built over undulating terrain.

There is therefore a need for an improved rail clip for attaching horizontal or angled fence rails to vertical fence posts.

BRIEF DESCRIPTION OF THE DRAWINGS

The preferred embodiments of the invention, illustrative of the best mode in which applicant has contemplated applying the principles, are set forth in the following description and are shown in the drawings and are particularly and distinctly pointed out and set forth in the appended claims.

DETAILED DESCRIPTION OF THE INVENTION

Figure 1:
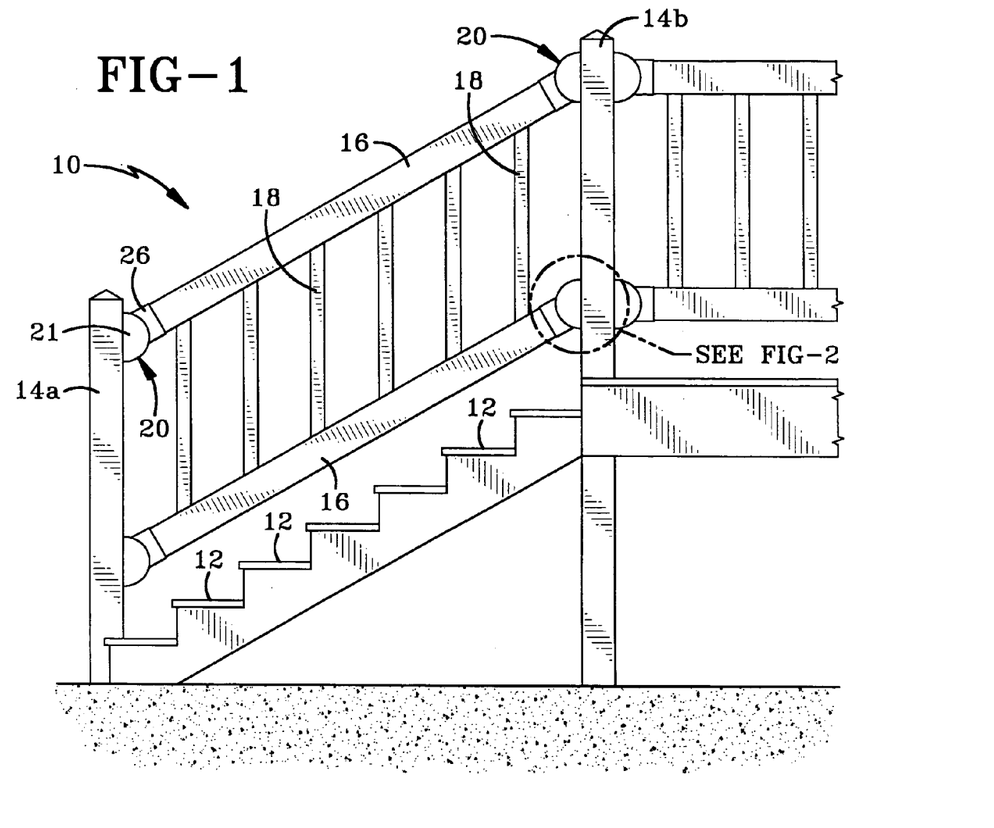
FIG. 1 is a partial side view of a staircase and deck utilizing the present invention.
Figure 2:
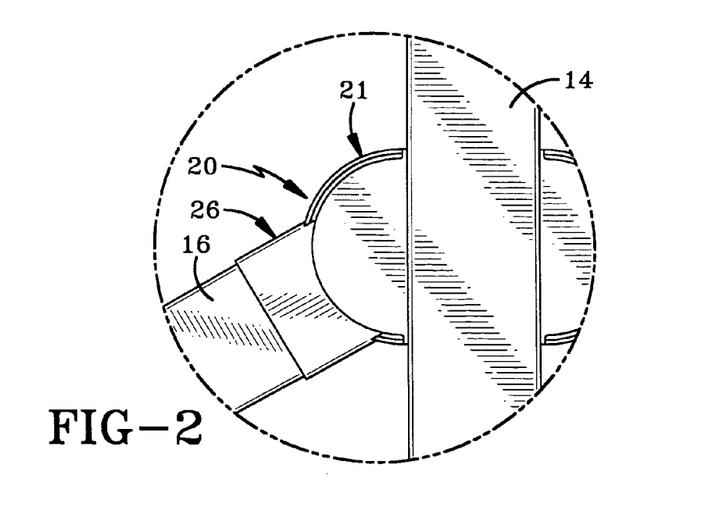
FIG. 2 is a magnified view of the circled area of the rail clip from FIG. 1.

Referring to FIG. 1 there is shown a staircase generally indicated by the numeral 10 that has stairs 12, vertical posts 14, and fence rails 16. Rails 16 are preferably molded from plastic or vinyl and are hollow. Posts 14 may be wooden rectangular shaped posts that extend upwardly from the ground. Rails 16 may be connected to each other by a plurality of cross-beams or balusters 18. Rail clips, generally indicated by the numeral 20, connect rails 16 to posts 14.

Figure 3:
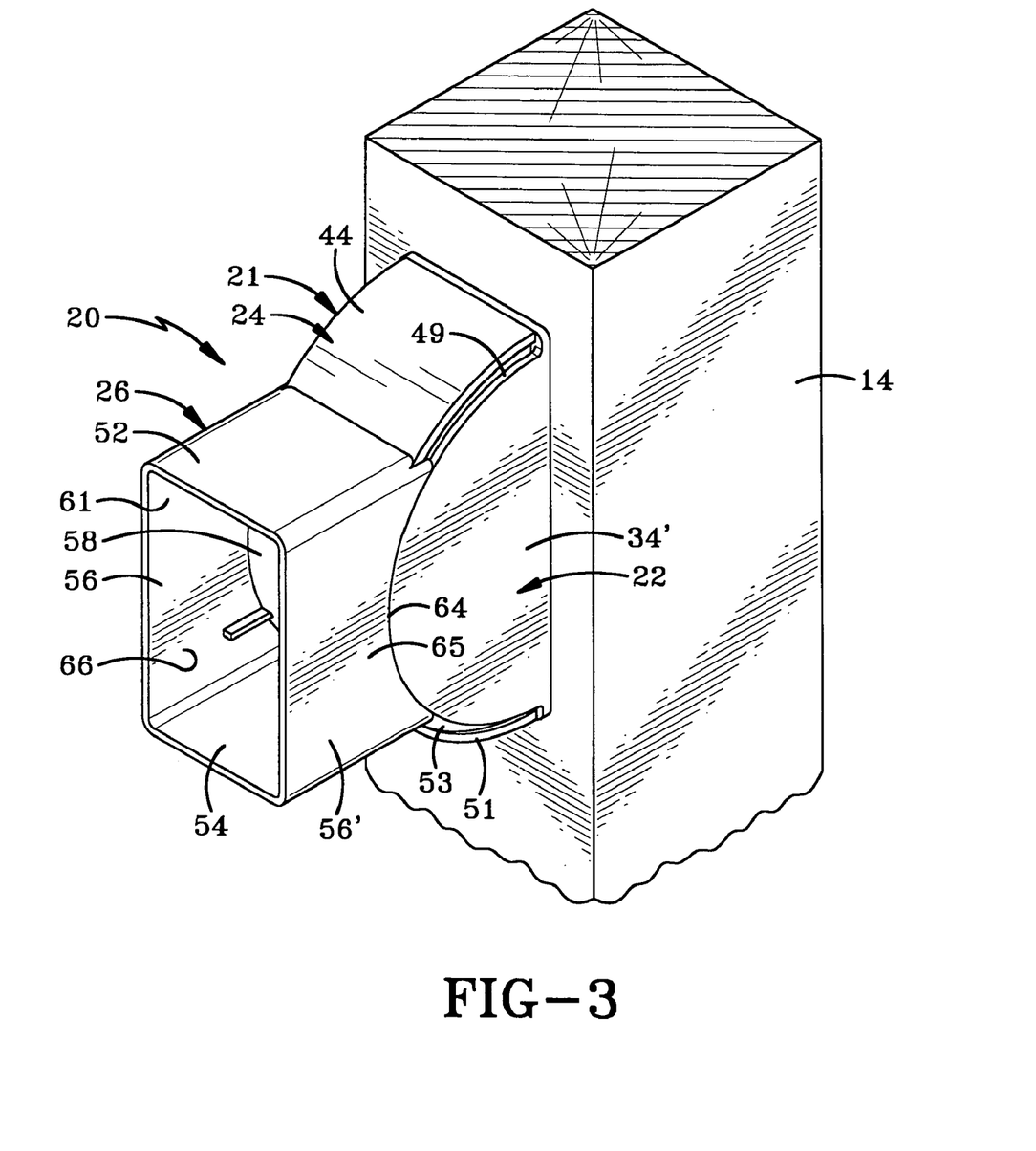
FIG. 3 is a perspective view of the rail clip in accordance with the present invention.
Figure 4:
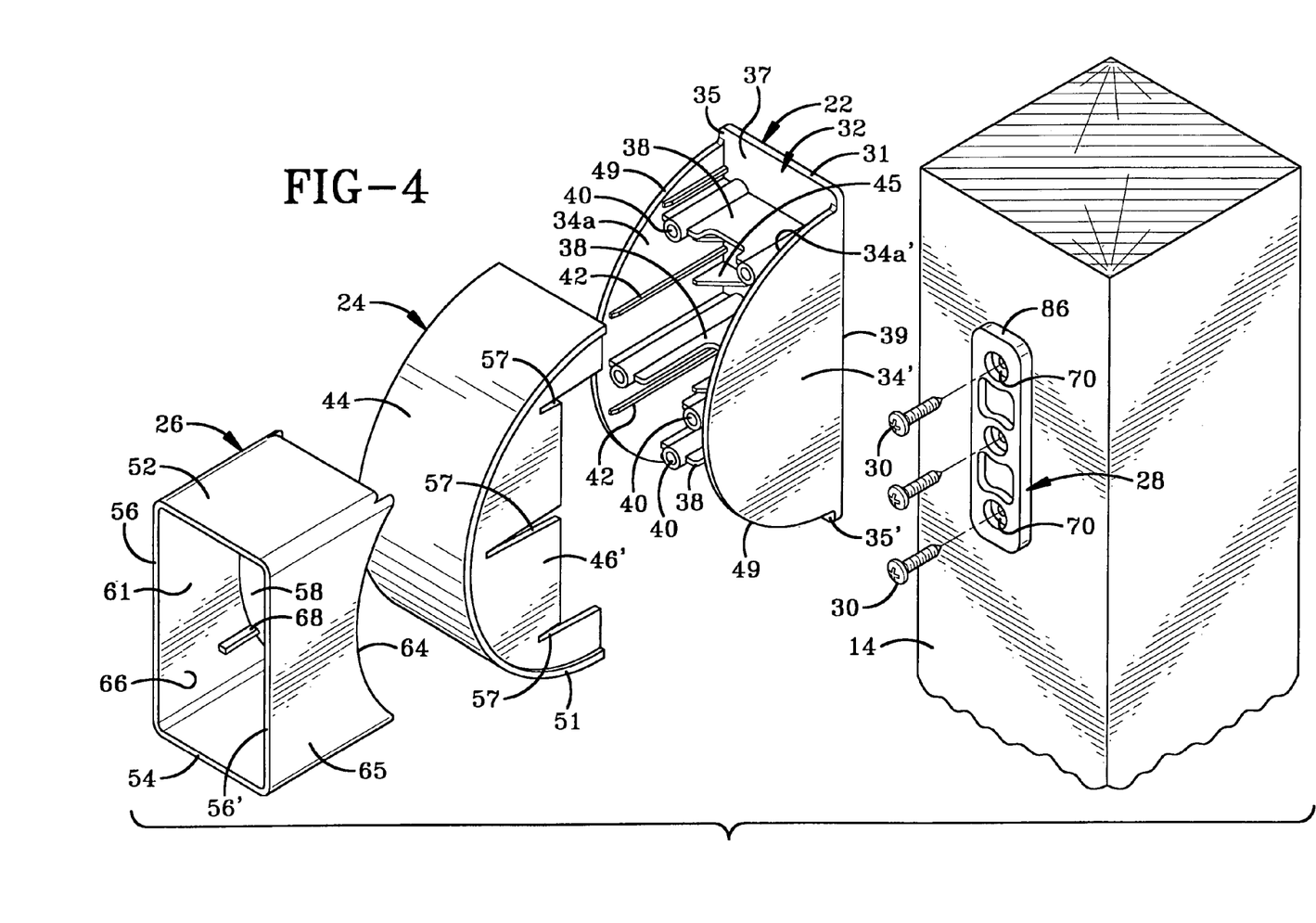
FIG. 4 is an exploded perspective view of the rail clip.

Rail clip 20 is preferably a multi-piece component that is molded of a resilient plastic material. Rail clip 20 may include a base 28, bracket 21 and a rail connector 26. Bracket 21 may be molded as a single unit or, as is shown in FIGS. 3–4, may be made up of a housing 22 and cover 24.

Figure 10:
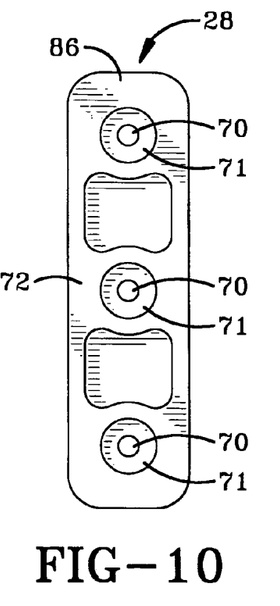
FIG. 10 is a front view of the base.
Figure 11:
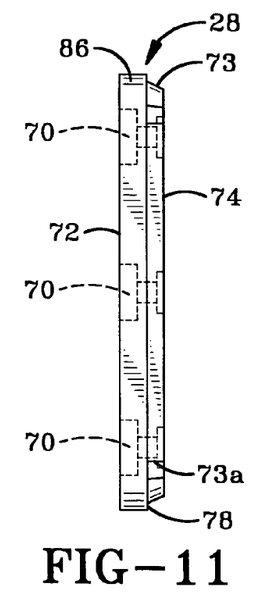
FIG. 11 is a side view of the base.
Figure 12:
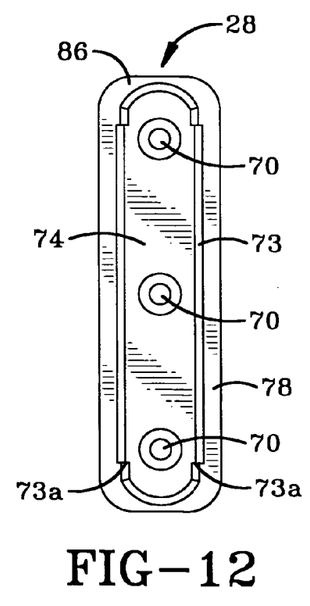
FIG. 12 is a rear view of the base.

Base 28 is preferably rectangular with rounded corners and has a front surface 72 and a rear surface 74 (FIGS. 10–12). A plurality of circular holes 70 are formed through base 28, each hole 70 having an enlarged counterbore formed in front surface 72 and forming a stepped shoulder 71. First screws 30 extend through holes 70 into a pair of holes (not shown) drilled in post 14 and axially aligned with holes 70. A peripheral outer edge 73 of base 28 is tapered inwardly from front surface 72 to rear surface 74 so that rear surface 74 is smaller than front surface 72. A lip 78 is formed in the region where front surface 72 extends beyond rear surface 74. Smaller rear surface 74 abuts post 14 when base 28 is mounted thereon.

Referring to FIGS. 4–7, housing or bracket 22 has a flat, generally U-shaped rear wall 32 and semicircular side surfaces 34, 34'. As may be seen from FIG. 4, side walls 34, 34' do not extend all the way to the top 31 and bottom 33 of rear wall 32. Ledges 35, 35' are formed between the top 31 and bottom 33 of rear wall 32 and the perimeters 49 of side surfaces 34, 34'. Rear wall 32 has an interior surface 37 and exterior surface 39 and has a pair of spaced-apart legs 41 that form a generally U-shaped slot 36 therebetween. Slot 36 is adapted to slidably receive base 28, the periphery of slot 36 being complimentarily shaped to engage the tapered outer edge 73 of base 28. Slot 36 is wider proximate bottom 33 of rear wall 32 and then narrows to form guides 76. Slot 36 then narrows further to a generally rectangular shaped area sized to receive and hold base 28. Shoulders 76a are provided proximate the upper end of guides 76 to engage with shoulders 73a on base 28. When base 28 is engaged in slot 36 the interlocking of shoulders 73a and 76a prevent withdrawal of base 28 from slot 36.

Figure 18:
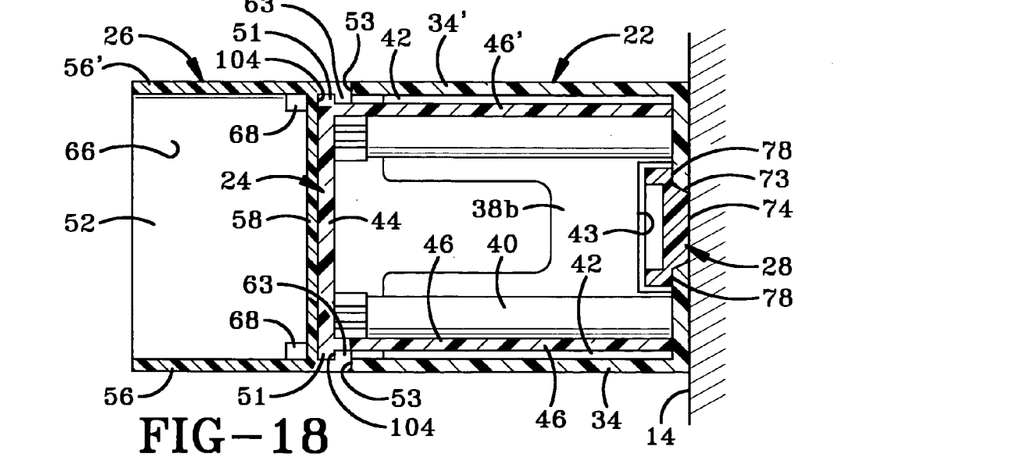
FIG. 18 is a cross-sectional bottom view of the rail clip attached to the post through line 18—18 of FIG. 17.
Figure 19:
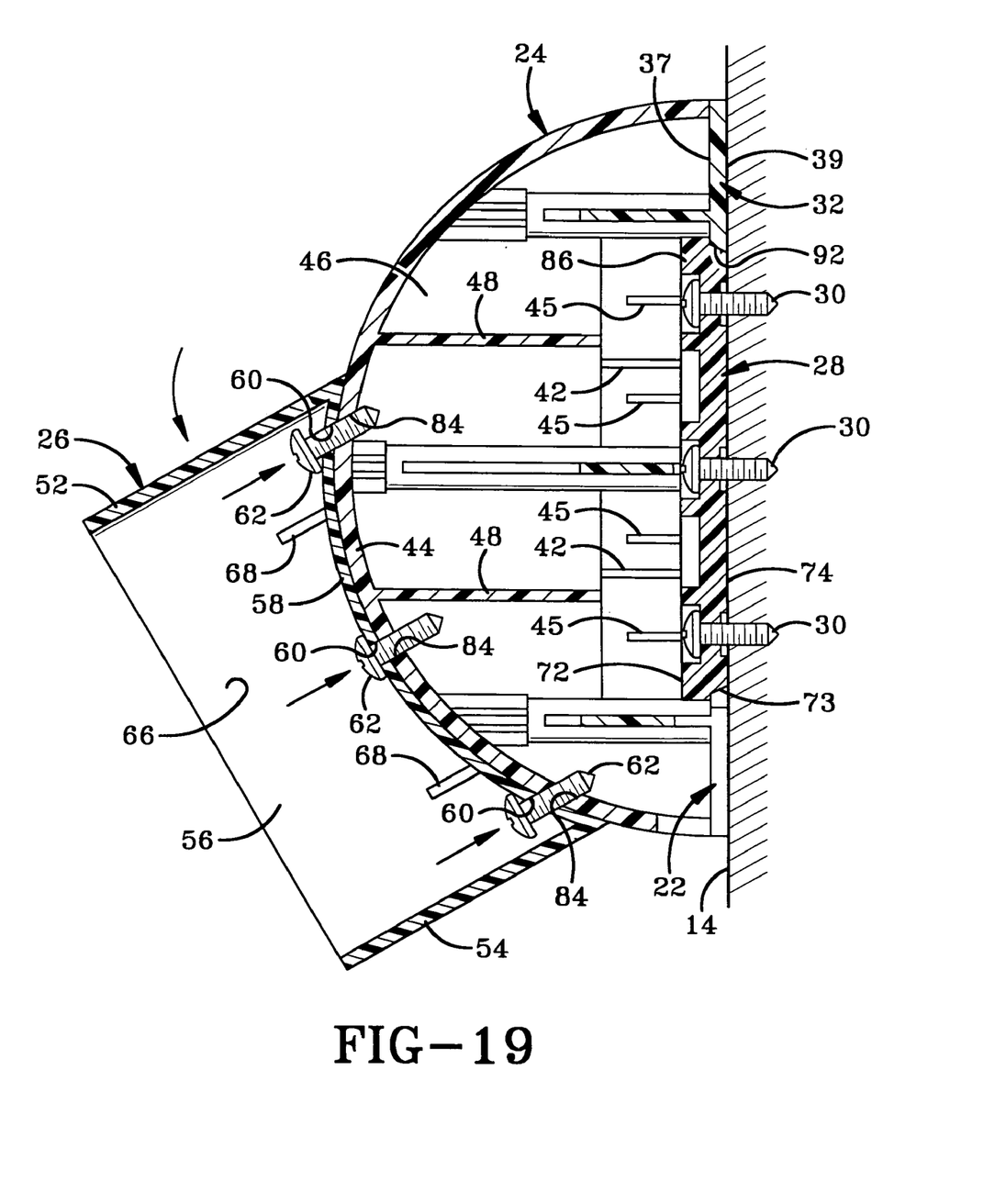
FIG. 19, is a cross-sectional side view of the rail clip attached to the post with the angular connected disposed at an angle to the post.

Housing 22 further includes three connecting walls 38a, 38b, 38c that are disposed at spaced intervals along interior surface 37 of rear wall 32. As may be seen from FIG. 18, walls 38b and 38c are generally H-shaped, defining a space 43 through which base 28 may slide. Connecting walls 38a, 38b and 38c connect side walls 34, 34' to each other and to rear wall 32. Connecting walls 38 define a plurality of pin-receiving holes 40. The region of the walls immediately surrounding holes 40 being reinforced. A number of spacers 42 are positioned on the interior surfaces 34*a*, 34'*a* of side walls 34, 34' so that when housing 22 and cover 24 are assembled together a small gap (not shown) exists between interior side surfaces 34*a*, 34'*a* and side walls 46, 46' of cover 24. Additionally, a number of brackets 45 extend between interior surface 37 of rear wall 32 and interior side walls 34*a*, 34'*a*. Brackets 45 strengthen housing 22.

Figure 6:
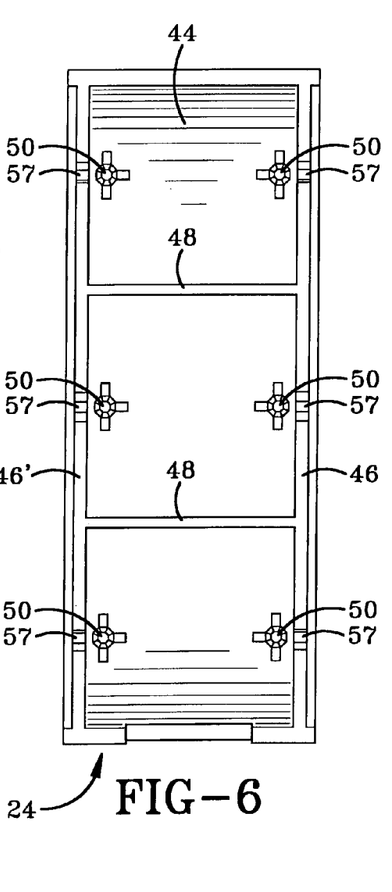
FIG. 6 is a front view of the cover of the rail clip.

Referring to FIGS. 4 and 6, cover 24 has a convexly curved outer wall 44 and two semicircular side walls 46, 46' that preferably extend at right angles from outer wall 44. The diameter of side walls 46, 46' is somewhat greater than the length of rear wall 32 of housing 22. Side walls 46, 46' therefore have a greater radius than that of side walls 34, 34' of housing 22. Additionally, the width of outer wall 44 is slightly less than the distance between interior faces 47, 47' of side wall 46 and side wall 46'. A rim 51 is therefore formed around the circumference of outer wall 44. As a result, when cover 24 and housing 22 are assembled together, a first groove 53 is formed between rim 51 of cover 24 and the perimeter 49 of side surfaces 34, 34'. (If bracket 21 is manufactured as a single unit (not shown) first groove 53 may be formed in the sides of the unit.) A number of connecting walls 48 may be disposed at spaced intervals along outer wall 44. Connecting walls 48 join walls 46, 46' to each other and to outer wall 44. A number of connector pins 50 extend from the interior face 55 of outer wall 44. Pins 50 are disposed a spaced distance from each other and the positions of pins 50 correspond to the positions of pin-receiving holes 40 of housing 22. Side walls 46, 46' are partially cut away (FIG. 4) proximate their mid-section and walls 46, 46' define a plurality of slits 57. Slits 57 are positioned adjacent pins 50. When cover 24 engages housing 22, slits 57 receive connecting walls 38*a*, 38*b*, 38*c* of housing 22 therein so that pin-receiving holes 40 are located in the correct position to receive pins 50. When connecting walls 38 are engaged in slits 57 they also assist in keeping housing 22 and cover 24 joined together and aid in preventing relative motion between cover 24 and housing 22.

Inasmuch as the pins 50 are adapted to interlock with pin-receiving holes 40 and the connecting walls 38*a*, 38*b* and 38*c* are adapted to be received into slits 57 and thereby secure housing 22 to cover 24, it will be obvious to those skilled in the art that these components may be manufactured on either of the housing 22 and cover 24, providing the complementary component is located on the other of the housing 22 and cover 24.

Figure 7:
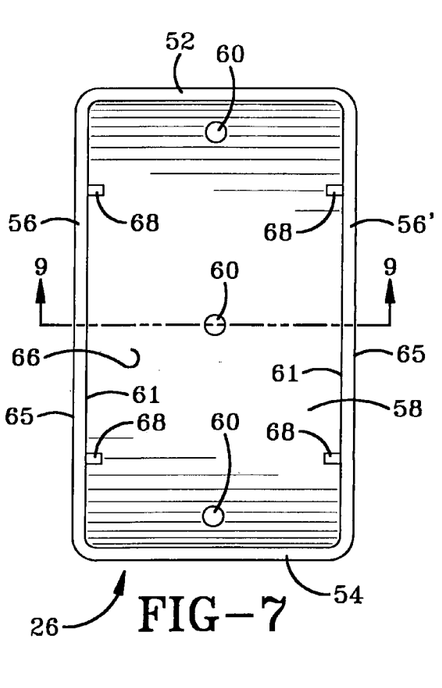
FIG. 7 is a front view of the rail connector of the rail clip.
Figure 8:
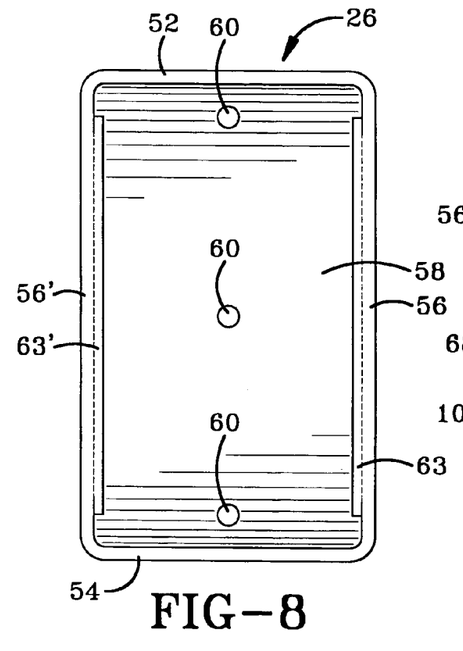
FIG. 8 is a rear view of the rail connector of the rail clip.
Figure 9:
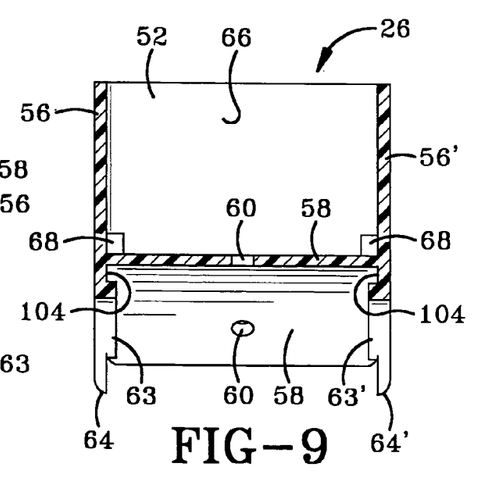
FIG. 9 is a side view of the rail connector through line 9—9 of FIG. 7.

Referring to FIG. 7, rail connector 26 has an upper wall 52, lower wall 54 parallel and spaced apart, side walls 56, 56' and concavely curved rear wall 58. Upper wall 52, lower wall 54 and side walls 56 form a rail receiving receptacle 66 into which an end of rail 16 may be inserted. Rear wall 58 partially projects into the rail receiving receptacle 66. The back edge 64, 64' of side walls 56, 56' is also concave in shape. Both rear wall 58 and side walls 56,56' are configured so that their curvature is complimentarily shaped to the curvature of outer wall 44 of cover 24. Rear wall 58 defines a plurality of holes 60 for receiving screws 62 for securing rail connector 26 to cover 24. As may be seen from FIG. 9, side walls 56, 56' extend a short distance beyond rear wall 58 so that a lip 78 is formed between back edge 64, 64' and rear wall 58. A ridge or boss 63 may be formed proximate back edge 64, 64' of each side wall 56, 56'. Ridge 63 runs along back edge 64, 64'. A second groove 104 is formed between ridge 63 and rear wall 58. While second groove 104 is shown as being formed between ridge 63 and rear wall 58, it may be cut into lip 78. Ridge 63 is adapted to engage in first groove 53 and allows rail connector 26 to slide along cover 24. The sliding engagement of rail connector 26 and cover 24 allows the user to position the rail receiving receptacle 66 at any one of a range of positions along outer wall 44 of cover 24. When a rail 16 is received within rail receiving receptacle 66, the rail 16 is disposed at a particular angle relative to bracket 21. As the position of rail connector 26 is changed by sliding it along first groove 53, the angle at which a rail 16 would be held relative to bracket 21 is changed. In this manner, the correct angle for attachment of rail 16 may be obtained. When the appropriate angle is determined by the installer, a drill bit (not shown) is inserted through holes 60. Holes 84 are then drilled into outer wall 44 of cover 24. Second screws 62 are then inserted through holes 60 and 84 to secure rail connector 26 to cover 24. Side walls 56, 56' have an interior face 61 and an exterior face 65 and a plurality of tabs 68 are disposed on interior face 61. Tabs 68 prevent an end 96 of rail 16 from contacting rear wall 58 of rail connector 26. While tabs 68 are shown on side walls 56, 56', they may instead be positioned on interior faces (not shown) of upper wall 52 and/or lower wall 54 or may be positioned on all of the side walls 56, 56', upper wall 52 and lower wall 54.

Rail clip 20 is used in the following manner.

Referring to FIG. 4, when the user wishes to attach rail 16 to post 14, the location of base 28 is marked on post 14. Rear surface 74 of base 28 is then placed against post 14. The position of holes 70 is marked onto post 14 and the installer drills holes (not shown) into post 14 in the marked positions. Base 28 is then repositioned onto post 14 and first screws 30 are inserted through holes 70 and into post 14. Screws 30 are screwed into post 14 until their heads rest on shoulder 71. It is of course possible to secure base 28 to post 14 by other suitable securing means such as nuts and bolts or rivets.

Rail connector 26 is then attached to cover 24 by sliding one of first end 96 or second end 98 of rail connector 26 onto one of first end 100 or second end 102 of cover 24. This is accomplished by inserting rim 51 into the second groove 104 formed between rear wall 58 and ridge 63 of rail connector 26. Rail connector 26 is slidingly moved relative to cover 24 until the two components are interlinked together. When in this position, rim 51 is disposed in second groove 104 and ridge 63 is disposed in first groove 53. The interlocking rim 51 and ridge 63 (FIG. 18) form a first connector mechanism joining rail connector 26 and cover 24 together.

The cover/rail connector combination 24/26 is then connected to housing 22 in the following manner. Slits 57 are aligned with connecting walls 38*a*, 38*b* and 38*c*. Cover/rail connector combination 24/26 and housing 22 are then pushed toward each other so that pins 50 engage in pin-receiving holes 40. As the cover/rail connector 24/26 and housing 22 move towards each other, ridge 63 is captured within first groove 53. Cover/rail connector 24/26 and housing 22 are pushed together until pins 50 lock in pin-receiving holes 40.

Figure 5:
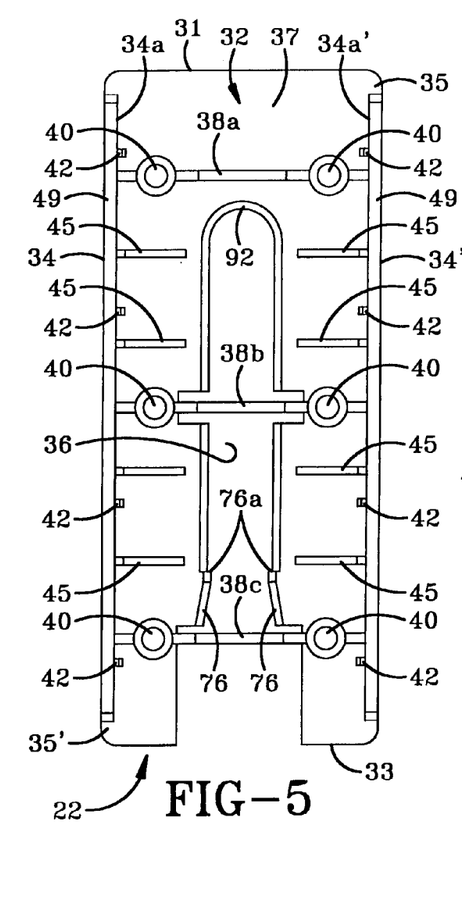
FIG. 5 is a front view of the bracket of the rail clip.
Figure 13:
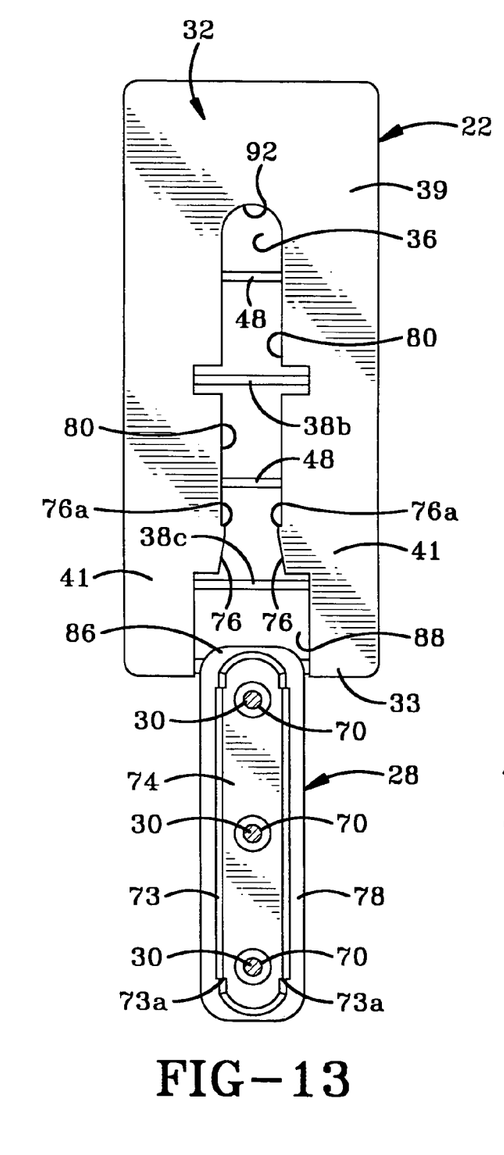
FIG. 13 is a rear view of the bracket beginning to engage the base.
Figure 14:
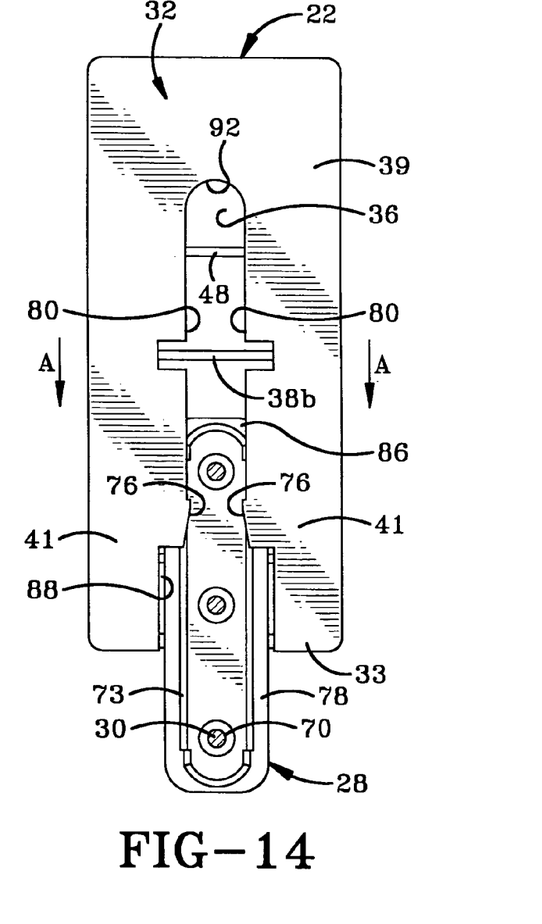
FIG. 14 is a rear view of the bracket partially engaged with the base.
Figure 15:
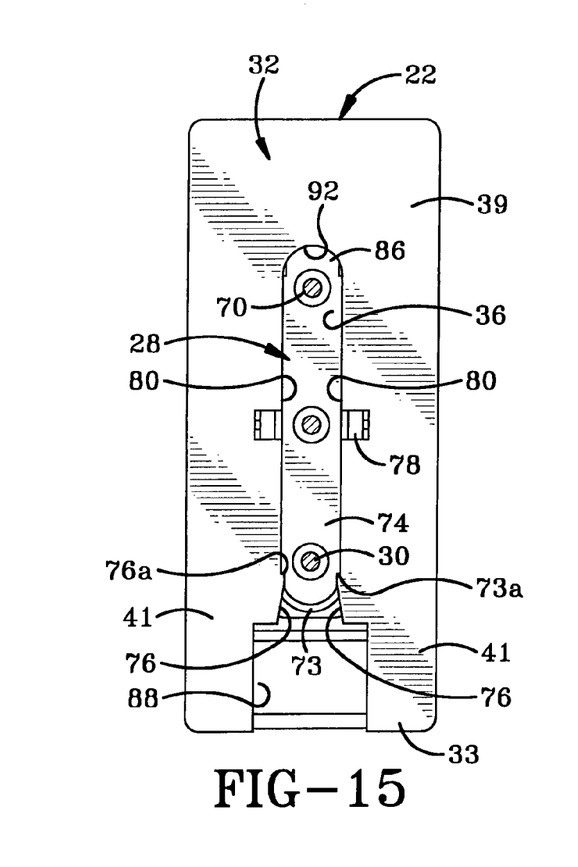
FIG. 15 is a rear view of the bracket fully engaged with the base.
Figure 16:
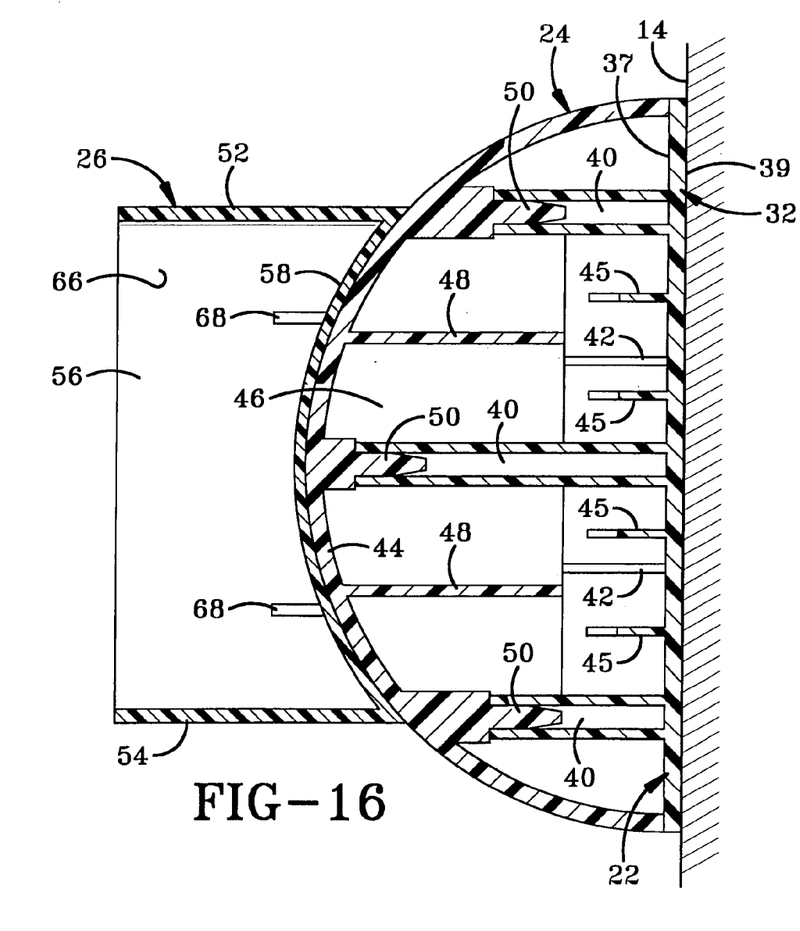
FIG. 16 is a cross-sectional side view of the rail clip positioned against the post.
Figure 17:
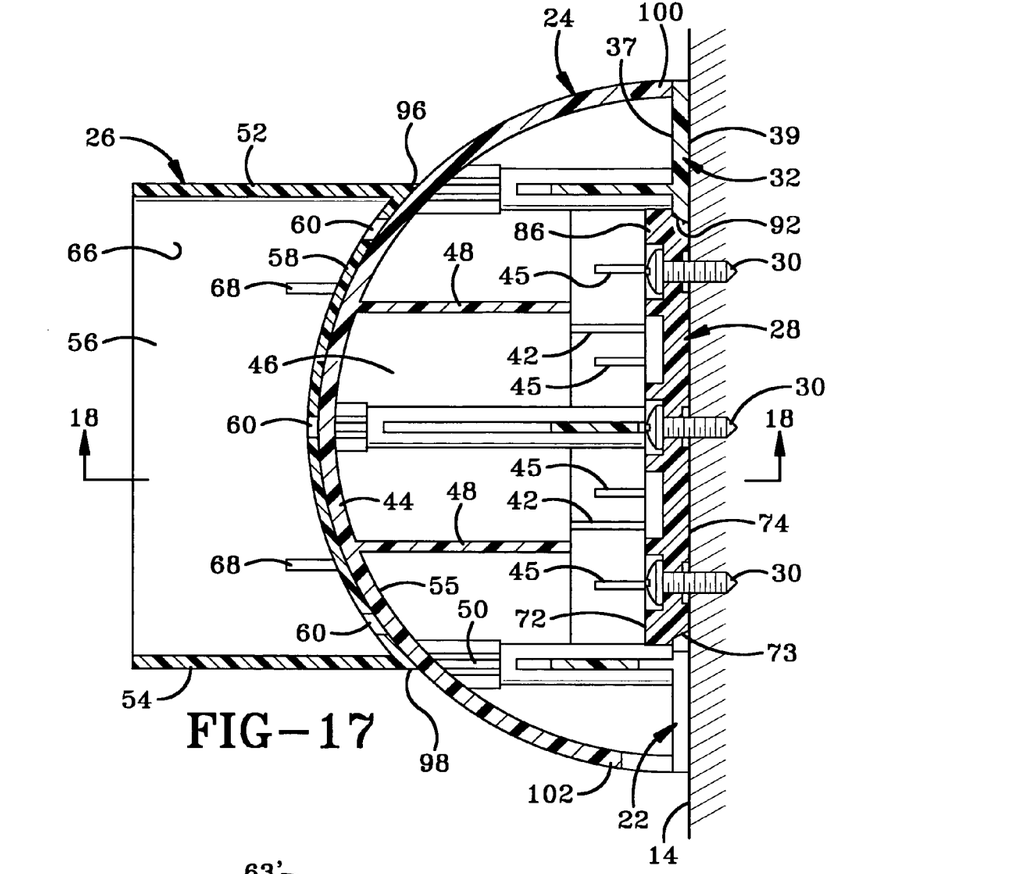
FIG. 17 is a cross-sectional side view of the rail clip attached to the post.

Referring to FIGS. 13–15, bottom end 33 of the housing/cover/rail connector combination 22/24/26 is brought into the vicinity of the top end 86 of base 28. Housing/cover/rail connector 22/24/26 is moved downwardly toward upper end 86 of base and is maneuvered in such a manner that upper end 86 of base enters the widest section 88 of slot 36. As combination 22/24/26 continues to move downwardly in the direction of arrow "A" in FIG. 14, top end 86 of base 28 moves between guides 76 and into the narrower portion of slot 36. In this position, the edges 80 of legs 41 of rear wall 32 slide under lip 78 of base 28. As combination 22/24/26 continues to move downwardly in the direction of "A" until top end 86 of base 28 contacts upper end 92 of slot 36 (FIG. 5). When base 28 is in this position, the housing/cover/rail connector 22/24/26 is securely mounted onto post 14.

As will be obvious to those skilled in the art, it is possible to assemble rail clip 20 in any other manner. For example, base 28 may be secured to post 14, then housing 22 may be connected to base 28. Cover 24 may then be interlocked with rail connector 26 and the combination of cover 24 and rail connector 26 may then be snapped into place over housing 22.

The installer then determines the appropriate angle required for rail 16 relative to post 14. Rail connector 26 is slidably moved relative to cover 24 until the correct position is reached. The installer then marks points to be drilled on outer wall 44 of cover 24 by inserting a marking implement (not shown) through holes 60 in rear wall 58 of rail connector 26. Holes 84 are then drilled into outer wall 44 and second screws 62 are inserted through holes 60 and into holes 84. Second screws 62 therefore comprise a second connector mechanism for securing rear wall 58 of rail connector 26 to outer wall 44 of cover 24.

Figure 20:
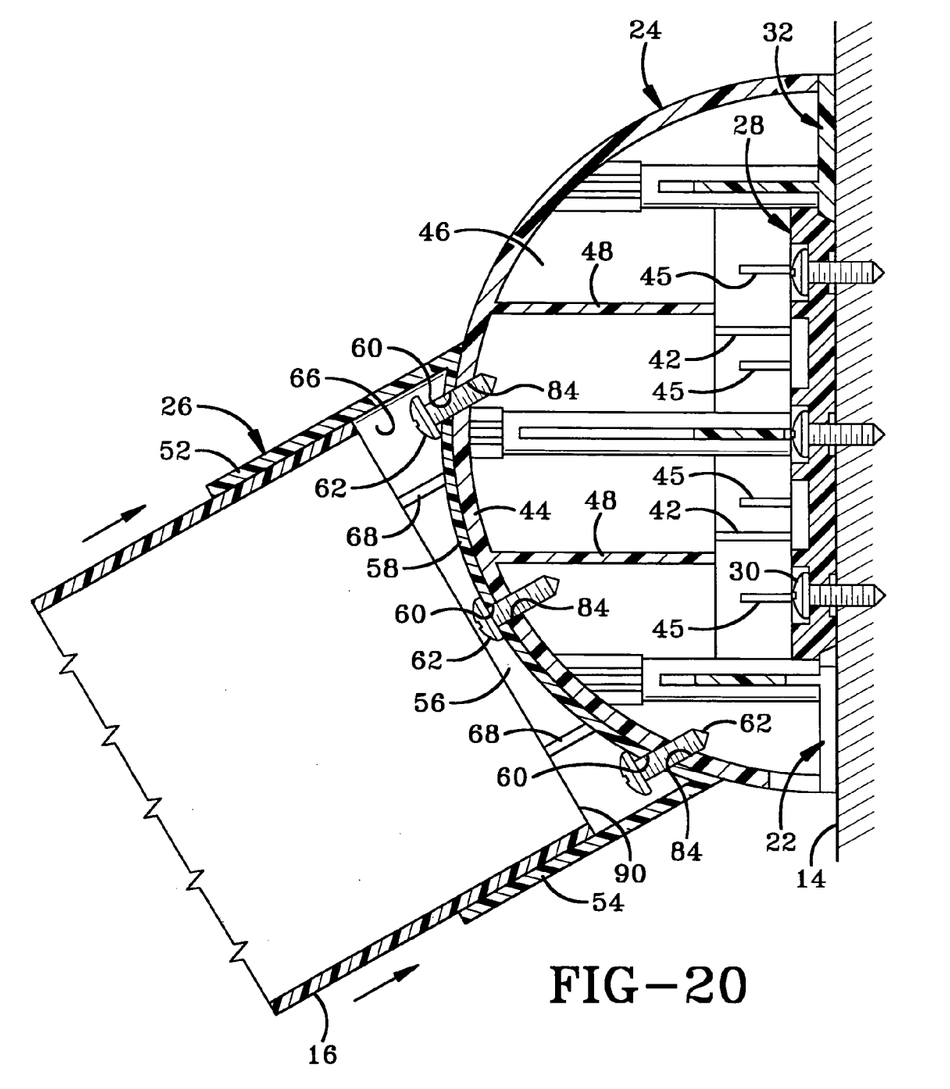
FIG. 20 is a cross-sectional side view of a rail being inserted into the rail connector of the rail clip.

An end 90 of rail 16 may then be inserted into rail receiving receptacle 66 (FIG. 20). End 90 is moved into receptacle 66 until it engages tabs 68.

Figure 21:
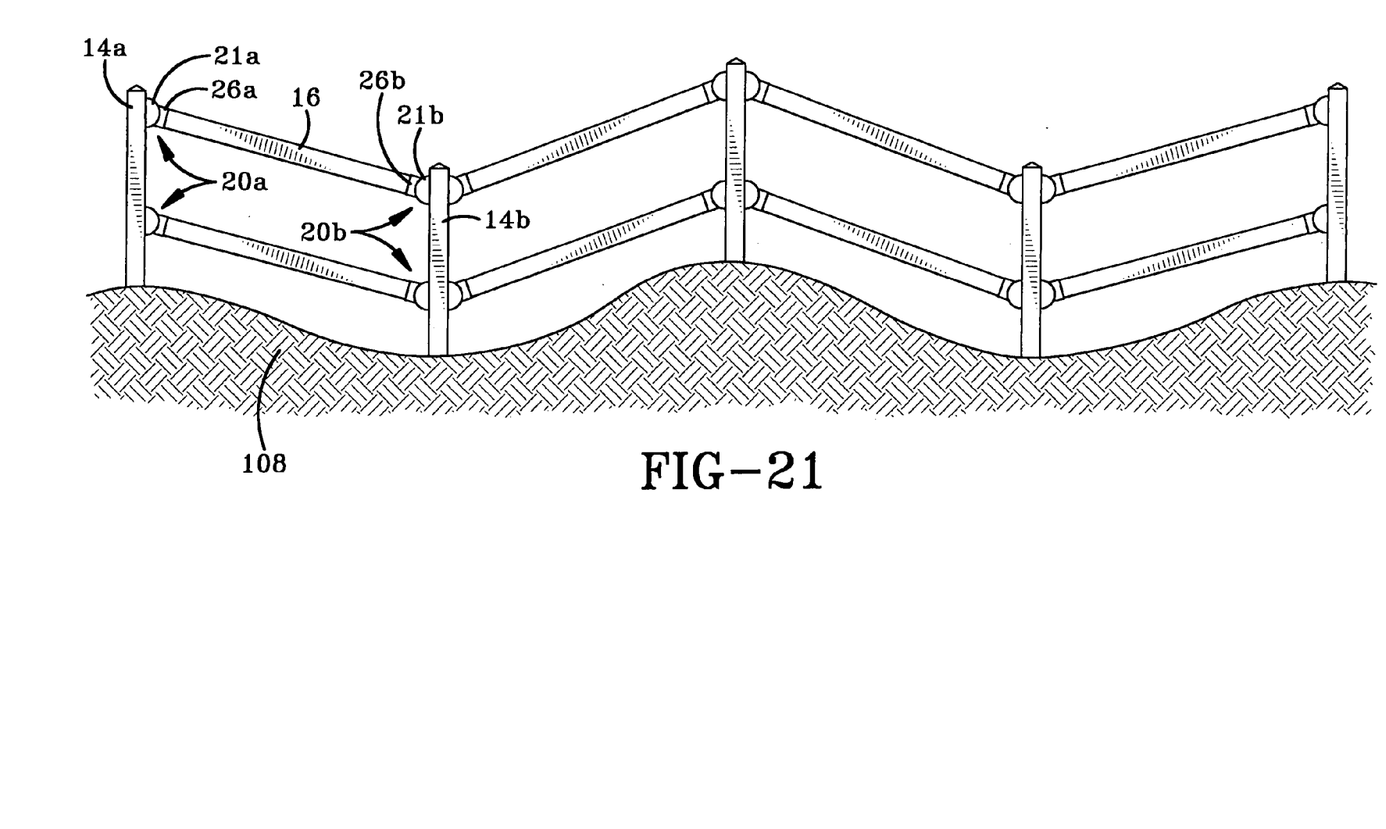
FIG. 21 is a side view of a fence constructed for undulating terrain and utilizing the rail clip of the present invention.

As may be seen from FIGS. 1 and 21, rail clips 20 may be installed on two adjacent posts 14a, 14b so that a rail 16 may be installed at the appropriate angle between the two posts 14a, 14b. The rail clips allow installers to install rails 16 at the correct angle even on fences that are erected on undulating terrain 108.

There is therefore provided a method of assembling a fence rail to a pair of fence posts comprising the following steps a. Mounting a first adjustable rail clip 20a having a first rail receiving area 26a to a post 14a;

b. Mounting a second adjustable rail clip 20b having a second rail receiving area 26b to a second post 14b;

c. Adjusting the first and second rail clips 20a, 20b such that the first and second rail receiving areas 26a, 26b are axially aligned;

d. Placing a rail 16 in each of the first and second rail receiving areas 26a, 26b in the aligned condition during mounting of at least one of the first and second rail clips 20a, 20b.

The method of assembly may further include the step of adjusting each rail clip 20a, 20b by sliding a movable rail connector 26a, 26b over a stationary bracket 21a, 21b.

The method of assembly may further include the step of mounting a stationary bracket 21a, 21b to each of the posts 14 and adjusting a rail connector 26a, 26b relative to each bracket 21a, 21b by rotating it accurately about a radius formed on the bracket 21a, 21b.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. A rail clip for attaching a rail to a post, the rail clip comprising:
    a bracket adapted to be mounted on the post, the bracket having an arcuate outer wall;
    a rail connector having a rear wall which lies in abutting contact with the outer wall of the bracket and slidingly engages the same; and wherein the position of the rail connector on the outer wall is adjusted by sliding the rail connector along the outer wall of the bracket,
    a first connector mechanism disposed on the rail connector and bracket which interlocks the rail connector and bracket together; and which allows the rear wall of the rail connector to slidingly move along the outer wall of the bracket to a desired position thereon; and wherein the first connector mechanism comprises:
    a first groove formed in one of the rail connector and the bracket: and
    a boss formed in the other of the rail connector and the bracket; whereby the boss and groove interlock with each other and allow sliding arcuate movement between the rail connector and bracket while substantially preventing the axial or lateral separation of the rail connector from the bracket; and
    a second connector mechanism to fixedly connect the rail connector to the bracket; and wherein said second connector mechanism is engaged when the rail connector is disposed at the desired position on the outer wall of the bracket.

2. A rail clip as defined in claim 1, in which the second mechanism comprises at least one fastener that extends from the rear wall of the rail connector and into the outer wall of the bracket and thereby fixably connects the bracket and rail connector together, substantially preventing further relative movement between the bracket and the rail connector.

3. A rail clip as defined in claim 1, in which the rear wall of the rail connector is complementary shaped to the outer wall of the bracket; and wherein the rail connector further comprises a peripheral wall extending forwardly and outwardly away from the rear wall of the rail connector; said peripheral wall defining an interior cavity therein, said cavity being adapted to receive an end of a rail therein.

4. A rail clip as defined in claim 3, in which a portion of the peripheral wall includes side walls each having an interior face adapted to abut a rail received with the interior cavity of the peripheral wall, an exterior face and front and back edges, wherein the front edges of the side walls lie remote from the bracket when the rail connector and bracket are engaged together, and wherein each of the side walls extends a short distance rearwardly beyond the rear wall of the rail connector thereby forming a lip between the back edge of each side wall and the rear wall of the rail connector; and wherein the lips abut an outer surface of the bracket.

5. A rail clip as defined in claim 4, in which the back edges of the side walls are concave in shape.

6. A rail clip as defined in claim 5, in which the back edge of the side walls is adapted to be complementary shaped with the outer wall of the bracket.

7. A rail clip as claimed in claim 6, in which the lip further includes a ridge, the ridge running along the back edge of the side wall.

8. A rail clip as claimed in claim 7, in which the bracket defines a first groove and the ridge of the rail connector interlocks with the first groove so as to connect the rail connector and bracket together while allowing sliding engagement between the bracket and rail connector; the ridge and first groove comprising the first mechanism for securing the bracket and rail connector together.

9. The rail clip as defined in claim 1, wherein the bracket has a rear wall and the bracket rear wall is substantially flat and is adapted to abut a substantially flat wall on the post.

10. The rail clip as defined in claim 1, in which the rail connector further comprises a peripheral wall extending forwardly and outwardly from the rear wall of the rail connector; said peripheral wall defining an interior cavity therein, said cavity being adapted to receive an end of a rail therein.

11. The rail clip as defined in claim 10, wherein an inner surface of the rear wall of the rail connector is concave in shape and projects partially into the interior cavity defined by the peripheral wall.

12. The rail clip as defined in claim 10, in which a portion of the peripheral wall includes side walls which each extend a short distance rearwardly beyond the rear wall of the rail connector and terminate in a back edge; and wherein the bracket includes side walls which define the first groove therein; and wherein the boss, which is interlockingly received with the first groove of each bracket side wall, is disposed on that portion of each side wall of the rail connector that extends beyond the rear wall thereof.

13. The rail clip as defined in claim 12, in which the back edges of the side walls of the rail connector are concave in shape.

14. A rail clip for attaching a rail to a post, the rail clip comprising:
    a bracket adapted to be mounted on the post, the bracket having an outer wall;
    a rail connector having a rear wall complementary shaped to the outer wall of the bracket and disposed in abutting contact therewith; and the rail connector further having a peripheral wall that extends forwardly and outwardly away from the rear wall thereof; said peripheral wall defining an interior cavity therein which is adapted to receive an end of the rail therein; and wherein the rear wall of the rail connector is concave in shape and projects partially into the interior cavity defined by the peripheral wall of the rail connector;
    a first connector mechanism disposed on the rail connector and bracket and which interlocks the rail connector and bracket together; such that the rear wall of the rail connector is slidingly movable along the outer wall of the bracket to any desired position; and
    a second connector mechanism adapted to fixedly connect the rail connector to the bracket; and wherein said second connector mechanism is engaged when the rail connector is disposed at the desired position on the outer wall of the bracket.

15. The rail clip as defined in claim 14, wherein the said second connector mechanism extends through the rear wall of the rail connector and into the outer wall of the bracket.

16. The rail clip as defined in claim 14, wherein the second connector mechanism is a screw.

* * * * *